United States Patent [19]
Chung et al.

[11] Patent Number: 5,517,139
[45] Date of Patent: May 14, 1996

[54] NON-LINEAR CIRCUIT AND CHAOTIC NEURON CIRCUIT USING THE SAME

[75] Inventors: Ho-sun Chung, Taegu; Yil-suk Yang, Kyungsangbuk-do, both of Rep. of Korea

[73] Assignee: Gold Star Electron Co., Ltd., Cheongju, Rep. of Korea

[21] Appl. No.: 381,514

[22] Filed: Feb. 1, 1995

[30] Foreign Application Priority Data

Feb. 2, 1994 [KR] Rep. of Korea .................. 94-1916

[51] Int. Cl.$^6$ .................................. G11C 27/02
[52] U.S. Cl. .................. 327/94; 327/561; 330/282; 395/24
[58] Field of Search .................. 327/560, 561, 327/563, 91, 94, 95, 96, 355, 361, 51, 52, 54; 333/213, 216, 217; 330/282, 284; 395/23, 24, 27

[56] References Cited

U.S. PATENT DOCUMENTS

| | | | |
|---|---|---|---|
| 3,838,346 | 9/1974 | Cox | 327/95 |
| 3,880,352 | 4/1975 | Ishida et al. | 327/95 |
| 4,194,165 | 3/1980 | Skulski | 330/282 |
| 4,350,959 | 9/1982 | Rosenbaum | 330/110 |
| 4,350,964 | 9/1982 | Chambers, Jr. | 333/216 |
| 5,061,865 | 10/1991 | Durst | 327/560 |
| 5,111,072 | 5/1992 | Seidel | 327/94 |
| 5,126,846 | 6/1992 | Niimura | 327/560 |
| 5,311,087 | 5/1994 | Saganuma | 327/94 |
| 5,410,195 | 4/1995 | Ichihara | 327/94 |

Primary Examiner—John S. Heyman
Assistant Examiner—My-Trang Nu Ton
Attorney, Agent, or Firm—Rothwell, Figg, Ernst & Kurz

[57] ABSTRACT

A non-linear circuit includes a first variable resistor one end of which is applied with an input signal, an amplifier whose inverting input is connected to the other end of the first variable resistor and whose non-inverting input is connected to ground, a second variable resistor one end of which is connected to the inverting input of the amplifier, a third variable resistor one end of which is connected to the output of the amplifier and the other end being connected to the other end of the second variable resistor, and a fourth variable resistor one end of which is applied with the input signal and the other end being connected to the third variable resistor. A chaotic neuron circuit using the non-linear circuit includes a first sample-and-hold circuit for sampling the input signal in response to a first clock signal, a non-linear circuit for generating an output signal having a non-linear characteristic with respect to the output of the first sample-and-hold circuit, an adder for summing the output signal of the non-linear circuit and an external input signal, a second sample-and-hold circuit for sampling the output of the adder in response to a second clock signal and for outputting the result to the input of the first sample-and-hold circuit, and a clock generator for generating the first and second clock signals. The non-linear circuit and the chaotic neuron circuit using the same have a simple constitution.

14 Claims, 6 Drawing Sheets

NON-LINEAR CIRCUIT AND CHAOTIC NEURON CIRCUIT USING THE SAME

BACKGROUND OF THE INVENTION

The present invention relates to chaotic neural networks, and more particularly, to a non-linear circuit and a chaotic neuron circuit using the same.

Chaos phenomenon exists throughout every field of science: astronomical physics, biology, chemistry, engineering, physical geography, mathematics, medical science, meteorology, sociology, etc. and much research has been reported. Particularly, research into the cerebral nerve system has been actively proceeded with biochaos theory. Recently, the research and development has proceeded into a neurocomputer for artificially realizing the excellent information processing capacity of the human brain by applying the brain construction of a neural network and an information processing mechanism of the brain. However, it is criticized that the conventional neuron model is overly simplified from the real neuron. One characteristic of a real neuron which cannot be described by the conventional simple neuron model is chaos response. A chaotic neural network slightly modified from the neuron models of Caianiello and Nagumo-Sato has been suggested which realizes the network via hardware means.

FIG. 1 is a block diagram of a conventional linear chaotic neuron circuit.

In FIG. 1, the linear chaotic neuron circuit comprises resistors R4 and R6 each of which receives an input signal Xn at one end, a resistor R5 one end of which is connected to the other end of resistor R4, a resistor R7 connected between the other end of resistor R6 and ground, a diode D1 whose cathode is connected to the other end of resistor R4, a diode D2 whose anode is connected to the other end of resistor R4, a variable resistor R1 connected between a voltage $V_1$ and the anode of diode D1, a variable resistor R2 connected between the cathode of diode D2 and a voltage $V_2$, an amplifier 1 whose inverting input is connected to the other end of resistor R5 and whose non-inverting input is connected to resistor R7, and a variable resistor R3 connected between the output and inverting input of amplifier 1.

FIG. 2 is a graph showing the relation of an output voltage f(Xn) to an input voltage Xn of the non-linear chaotic neuron circuit shown in FIG. 1. Here, folding point values E1 and E2 are defined as $4(V_1-V_{D1})/3$ and $4(V_1-V_{D1})/3$, respectively.

The variables K1, K2 and K3 of FIG. 2 are determined according to the resistance values of the circuit shown in FIG. 1 and, assuming that resistors R4, R5, R6 and R7 each have the same value (R), can be expressed as follows.

$$K1 = \frac{R(2R_1 + R + R_3) - R_1 R_3}{2R(2R_1 - R)}$$

$$K2 = \frac{2R - R_3}{4R}$$

$$K3 = \frac{R(2R_2 + RR_3) - R_2 R_3}{2R(2R_2 + R)}$$

However, the constitution of the above non-linear chaotic neuron circuit having a non-linear characteristic as shown in FIG. 2 is complicated.

SUMMARY OF THE INVENTION

It is an object of the present invention to provide a non-linear circuit having a simple constitution.

It is another object of the present invention to provide a chaotic neuron circuit using the non-linear circuit.

To achieve the above first object of the present invention, there is provided a non-linear circuit comprising: a first variable resistor one end of which receives an input signal; an amplifier whose inverting input is connected to the other end of the first variable resistor and whose non-inverting input is connected to ground; a second variable resistor one end of which is connected to the inverting input of the amplifier; a third variable resistor one end of which is connected to the output of the amplifier and the other end being connected to the other end of the second variable resistor; and a fourth variable resistor one end of which receives the input signal and the other end being connected to the third variable resistor.

To achieve the above second object of the present invention, there is provided a chaotic neuron circuit using the above non-linear circuit comprising: a first sample-and-hold circuit for sampling an input signal in response to a first clock signal; non-linear means for generating an output signal having a non-linear characteristic with respect to the output of the first sample-and-hold circuit; an adder for summing the output signal of the non-linear means and an external input signal; a second sample-and-hold circuit for sampling the output of the adder in response to a second clock signal and outputting the result to the input of the first sample-and-hold circuit; and a clock generator for generating the first and second clock signals.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
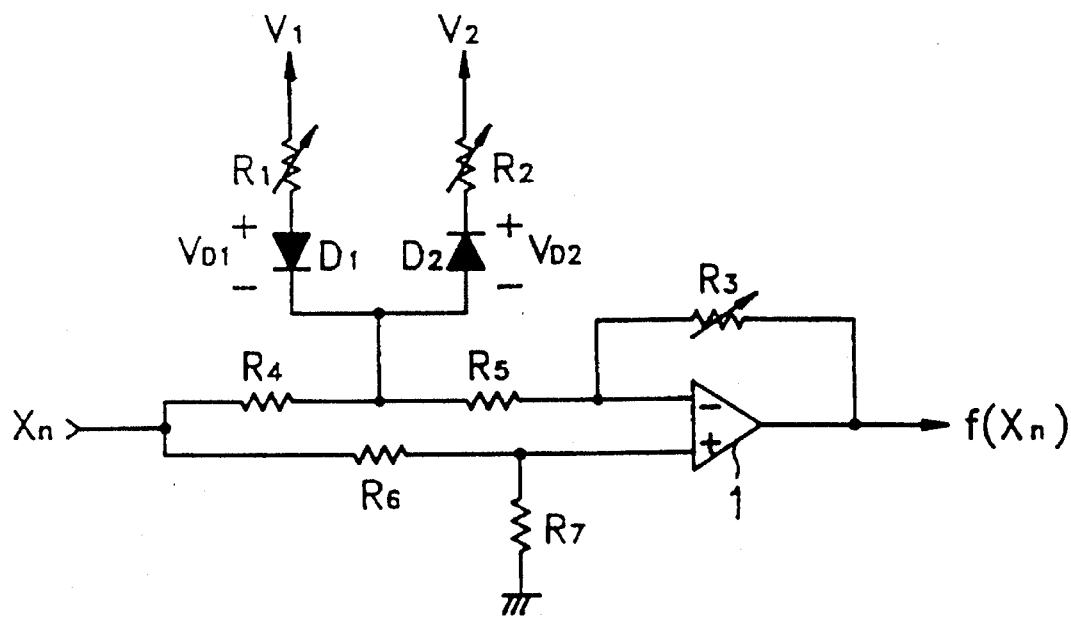
FIG. 1 is a circuit diagram of the conventional non-linear circuit.
Figure 2:
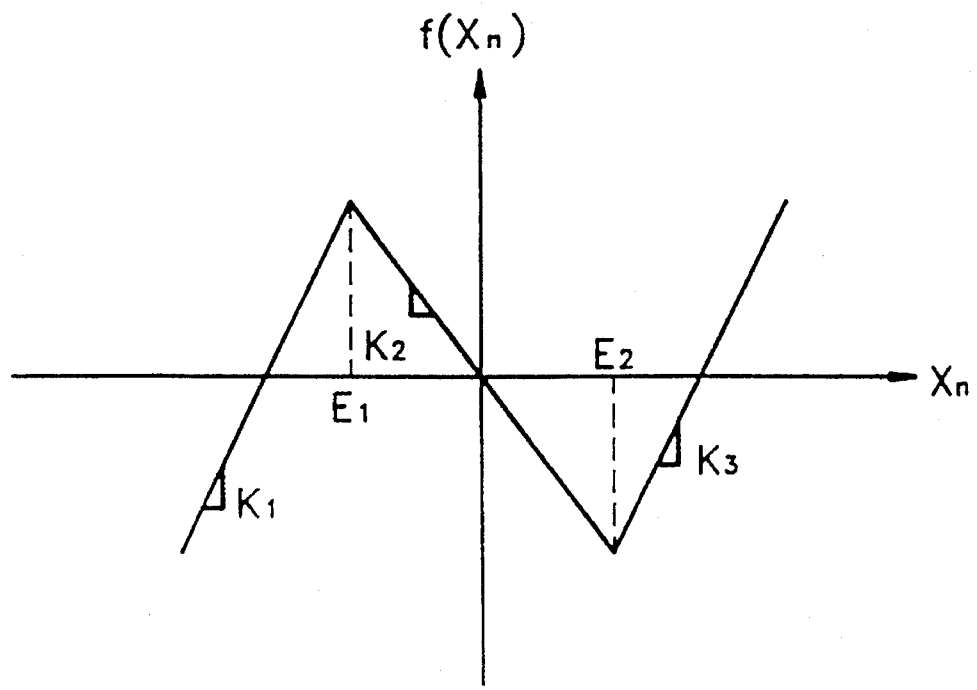
FIG. 2 is a transfer characteristic curve of the circuit shown in FIG. 1.
Figure 3:
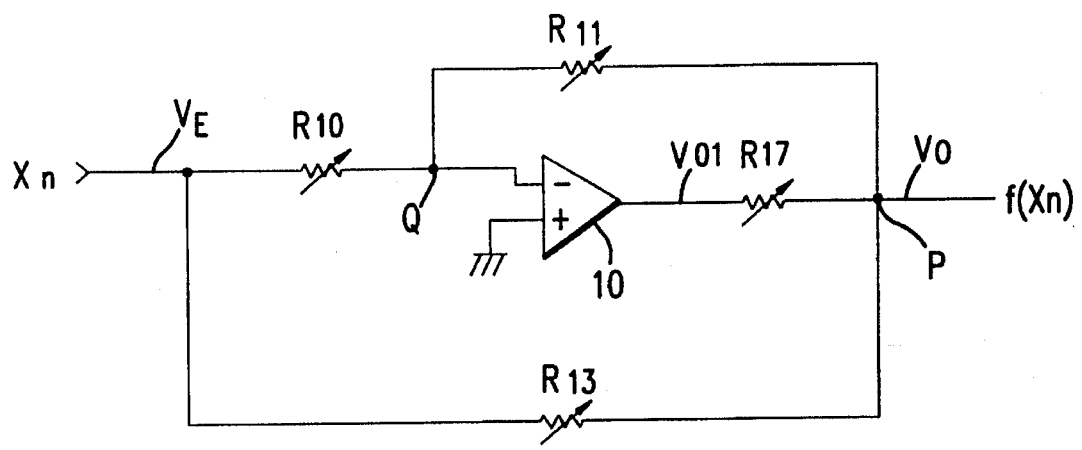
FIG. 3 is a circuit diagram of a non-linear circuit according to the present invention.

In FIG. 3, a non-linear circuit comprises a variable resistor R10 to one end of which is applied an input signal Xn, an amplifier 10 whose inverting input is connected to the other end of variable resistor R10 and whose non-inverting input is connected to ground, a variable resistor R12 one end of which is connected to the output of amplifier 10, a variable resistor R11 connected between the inverting input of amplifier 10 and the other end of variable resistor R12, and a variable resistor R13 to one end of which is applied input signal Xn and the other end being connected to the other end of variable resistor R12.

Figure 4:
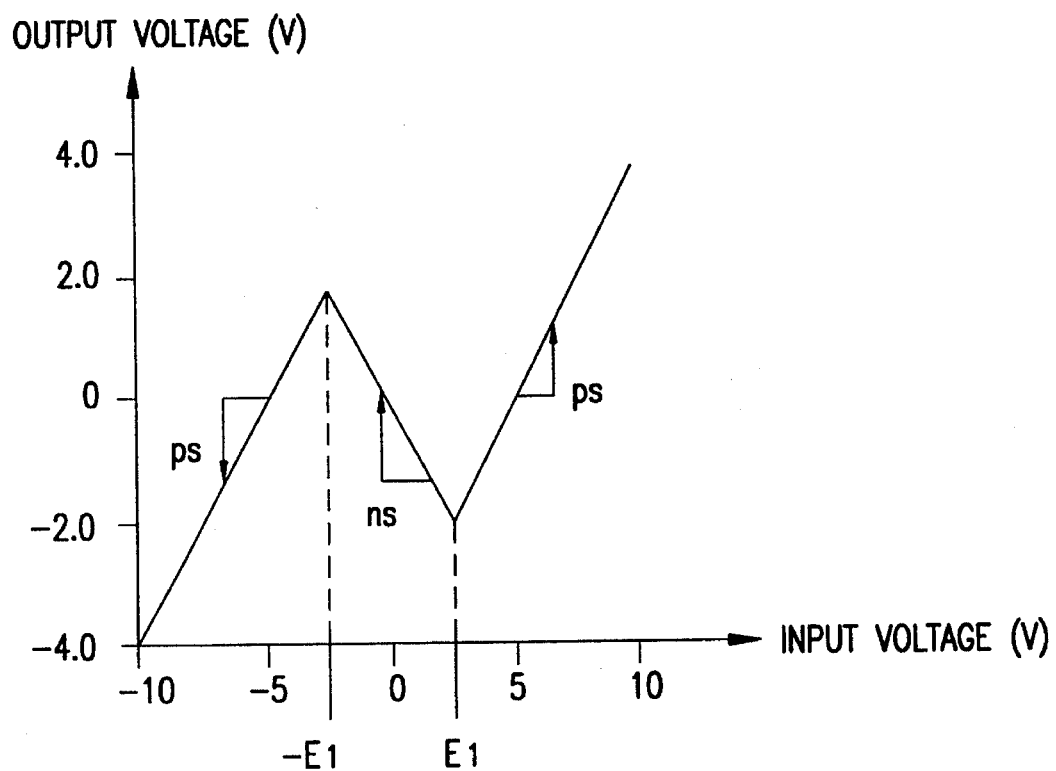
FIG. 4 is a transfer characteristic curve of the circuit shown in FIG. 3.

FIG. 4 shows an output voltage characteristic with respect to the input voltage of the non-linear circuit shown in FIG. 3. Here, three linear regions divided at folding points E1 and −E1 are expressed as follows.

$$f[y(t)] = y(t)ps − (ns − ps)/ps \qquad \text{for } y(t) < −E1$$
$$f[y(t)] = y(t)ps + (ns − ps)/y(t)E1 \qquad \text{for } −E1 < y(t) < E1$$
$$f[y(t)] = y(t)ps + (ns − ps)/ps \qquad \text{for } y(t) > E1$$

where $y(t)$ is the response of a chaotic circuit at time t, ps and ns are the positive and negative slopes, respectively. The result of the interpretation of Kirchoff's current law in the output point P of the non-linear circuit shown in FIG. 3 is as follows, in which $V_\epsilon$ is an input voltage, $V_{o1}$ is the output voltage of amplifier 10, $V_o$ is the output voltage of the non-linear circuit and the negative input end of amplifier 10 is virtually grounded.

$$\frac{-V_\epsilon}{R_{10}} = \frac{V_o - V_{o1}}{R_{12}} + \frac{V_o - V_\epsilon}{R_{13}}$$

The summarized form of the above equation is as follows.

$$V_o = V_\epsilon \left( \frac{R_{12}(R_{10} - R_{13})}{R_{10}(R_{12} + R_{13})} \right) + V_{o1} \left( \frac{R_{13}}{R_{12} + R_{13}} \right)$$

The folding points are calculated as $\pm V_o(R_{10}/R_{11})$ so that the equations for slopes ns and ps are as follows.

$$ps = \frac{R_{12}(R_{10} - R_{13})}{R_{10}(R_{12} + R_{13})}$$

$$ns = ps - ps \left( \frac{R_{13} E1}{R_{12} + R_{13}} \right)$$

The three values of $V_{o1}$ obtained from the above equations are as follows.

$$V_{o1} = V_{cc} - 2 \qquad \text{for } V_\epsilon < -E1$$
$$V_{o1} = -V_\epsilon \qquad \text{for } -E1 < V_\epsilon < E1$$
$$V_{o1} = -(V_{cc} - 2) \qquad \text{for } V_\epsilon > E1$$

Here, $V_{cc}$ is not shown in FIG. 3, but represents a common power voltage applied to the amplifier 10. From the above equations, it is known that if the value of the variable resistance is controlled, the transfer characteristic curve can be varied. Therefore, the present invention can provide the non-linear characteristic which can be adapted in the chaotic neuron circuit having a simple construction.

Figure 5:
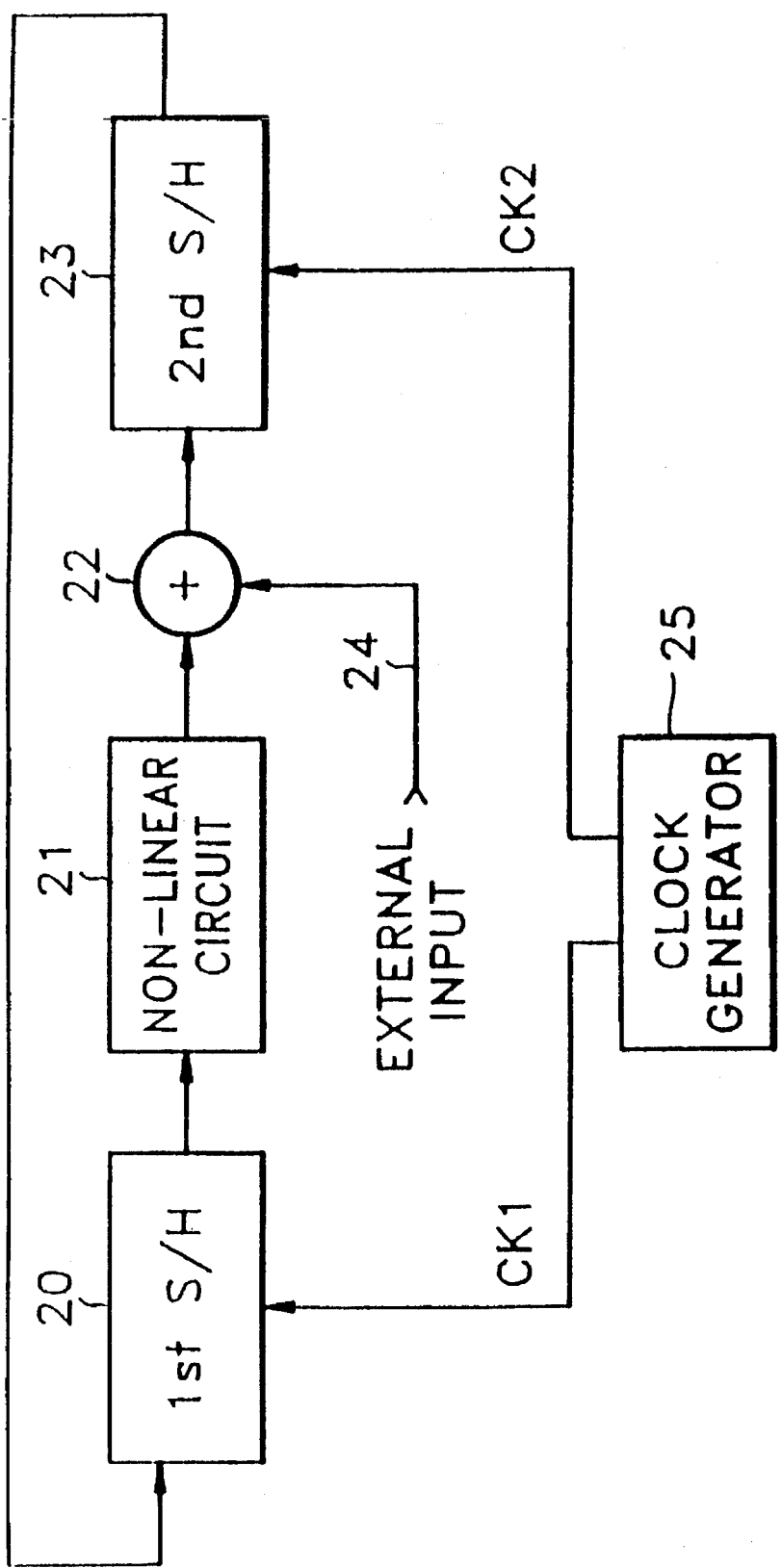
FIG. 5 is a block diagram of a chaotic neuron circuit using non-linear circuit of a preferred embodiment according to the present invention.

FIG. 5 is a block diagram of a chaotic neuron circuit using the non-linear circuit of a preferred embodiment according to the present invention. In FIG. 5, the chaotic neuron circuit comprises a first sample-and-hold (S/H) circuit 20 for sampling the input in response to a clock signal CK1, a non-linear circuit 21 for receiving the output of first sample-and-hold circuit 20 and outputting an output signal having a non-linear characteristic with respect to the input, an adder 22 for summing the output signal of non-linear circuit 21 and external input signal 24, a second sample-and-hold circuit 23 for sampling the output of adder 22 in response to a clock signal CK2, and a clock generator 25 for generating clock signals CK1 and CK2.

The above chaotic neuron circuit can be expressed by the following differential equation:

$$y(t+1) = f[y(t)] + a$$

where y(t) is the response of the chaotic circuit at time t, a is an external input, and f is a non-linear function. If the transfer characteristic curve of the non-linear circuit has a very large ns value, the response of the chaotic circuit approaches its hard limit.

Figure 6:
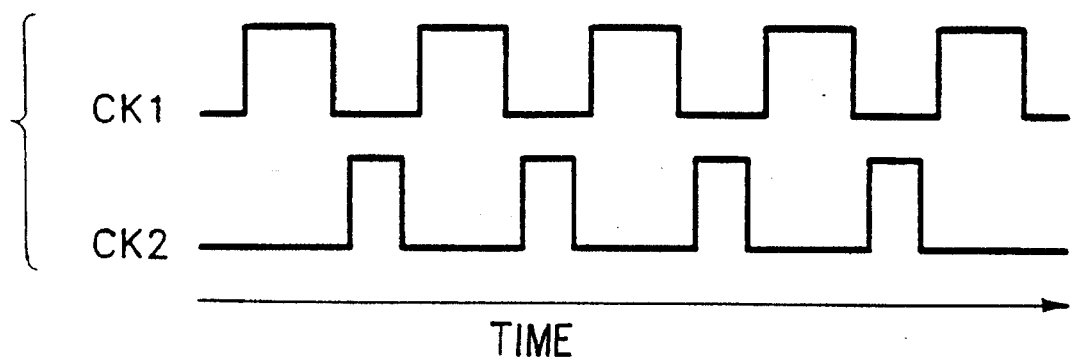
FIG. 6 is a diagram showing the timing of clock signals CK1 and CK2 shown in FIG. 5.

FIG. 6 is a diagram showing a timing of clock signals CK1 and CK2 shown in FIG. 5. Here, it should be noted that clock signals CK1 and CK2 do not overlap each other.

Figure 7:
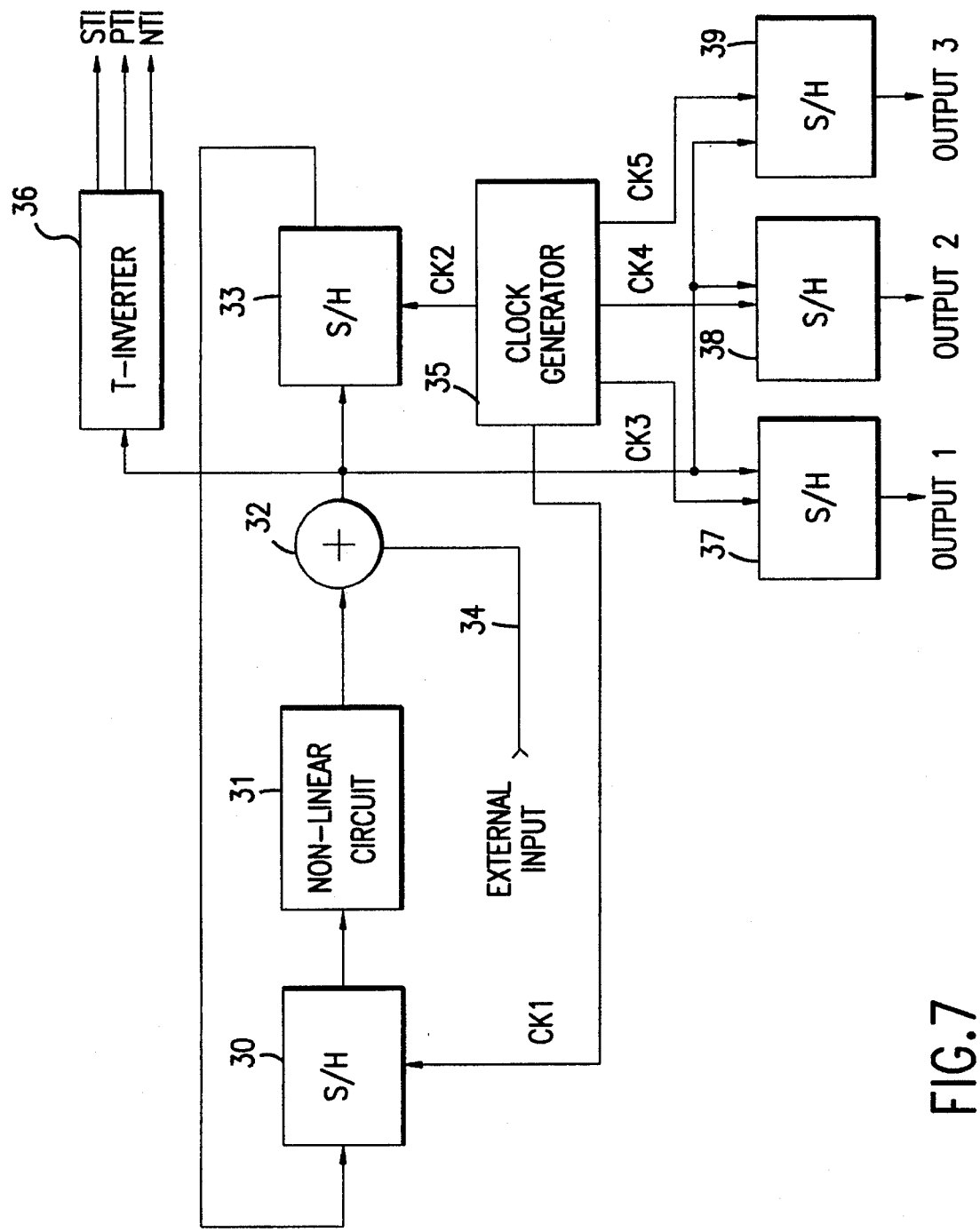
FIG. 7 is a block diagram of a chaotic neuron circuit using non-linear circuit of another preferred embodiment according to the present invention.

FIG. 7 is a block diagram of a chaotic neuron circuit using the non-linear circuit of another preferred embodiment according to the present invention. In FIG. 7, the chaotic neuron circuit comprises a sample-and-hold circuit 30 for sampling the input in response to a clock signal CK1, a non-linear circuit 31 for generating an output signal having a non-linear characteristic with respect to the output of sample-and-hold circuit 30, an adder 32 for receiving and summing the output signal of non-linear circuit 31 and the external input signal 34, a sample-and-hold circuit 33 for receiving and sampling the output of adder 32 in response to a clock signal CK2, a clock generator 35 for generating clock signals CK1 and CK2 and clock signals CK3, CK4 and CK5 obtained by dividing clock signal CK2, and sample-and-hold circuits 37, 38 and 39 for sampling the output of the adder and outputting three output signals (output 1, output 2 and output 3) in response to clock signals CK3, CK4 and CK5, respectively. In FIG. 7, the input of the T-inverter 36 is connected to the output of adder 32. Accordingly, the chaotic circuit according to the present invention can be applied for controlling a multi-value logic circuit.

Figure 8:
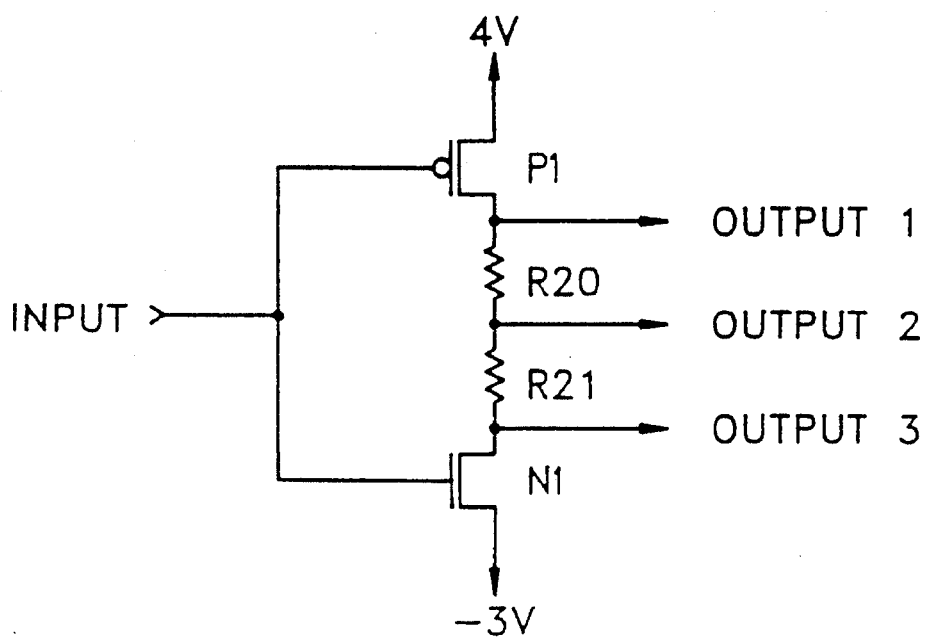
FIG. 8 is a circuit diagram of the T-inverter of FIG. 7.

FIG. 8 is a circuit diagram of T-inverter 36 shown in FIG. 7. In FIG. 8, the T-inverter comprises a PMOS transistor P1 to whose gate is applied an input and whose source is commonly connected to a first power voltage (here, +4 V), a resistor R20 one end of which is connected to the drain of PMOS transistor P1 and a first output terminal, a resistor R21 one end of which is commonly connected to the other end of resistor 20 and a second output terminal, and an NMOS transistor N1 whose drain is commonly connected to the other end of resistor R21 and a third output terminal, whose source is connected to a second power voltage (here, −3 V) and whose gate receives the input signal.

A truth table of the T-inverter of FIG. 8 is shown below.

| X | $(X)^2$ | $(X)^1$ | $(X)^0$ |
|---|---------|---------|---------|
| 2 | 0 | 0 | 0 |
| 1 | 2 | 1 | 0 |
| 0 | 2 | 2 | 2 |

The three outputs of the T-inverter are as follows.

$$STI: \quad \overline{(X)^1} = 2 - X$$

$$PTI: \quad \overline{(X)^2} = 0 \qquad \text{for } X = 2$$
$$\phantom{PTI: \quad} \overline{(X)^2} = 2 \qquad \text{for } X \neq 2$$

$$NTI: \quad \overline{(X)^0} = 2 \qquad \text{for } X = 0$$
$$\phantom{NTI: \quad} \overline{(X)^0} = 0 \qquad \text{for } X \neq 0$$

That is, the outputs of the inverter are a simple ternary inversion (STI), a positive ternary inversion (PTI) and a negative ternary inversion (NTI).

Figure 9:
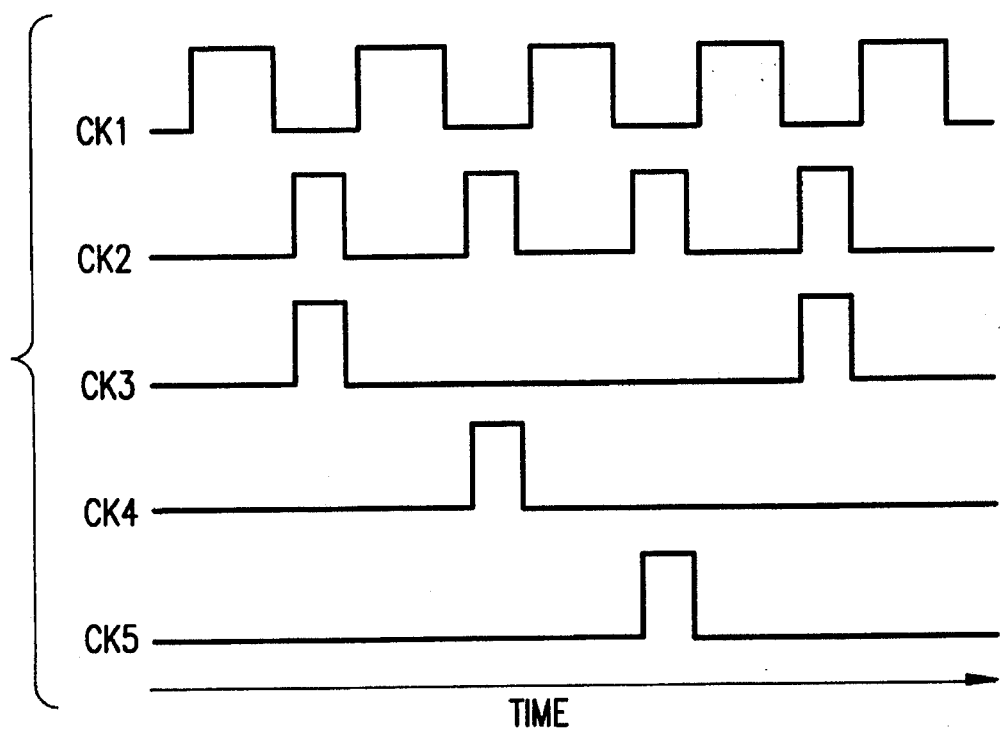
FIG. 9 is a diagram showing the timing of clock signals CK1, CK2, CK3, Ck4 and CK5 shown in FIG. 7.

FIG. 9 is a diagram showing the timing of clock signals CK1, CK2, CK3, CK4 and CK5 shown in FIG. 7.

The response of the chaotic circuit divides clock signal CK2 into three clock signals so as to correspond with clock signal CK2 and control the response. Thus, three clock signals CK3, CK4 and CK5 are obtained from clock signal CK2 and control the level as high, intermediate and low, respectively. That is, in FIG. 7, clock signals CK3, CK4 and CK5 are input to the respective sample-and-hold circuits 37, 38 and 39, to thereby control the outputs 1, 2 and 3 of the sample-and-hold circuits 37, 38, and 39.

Figure 10:
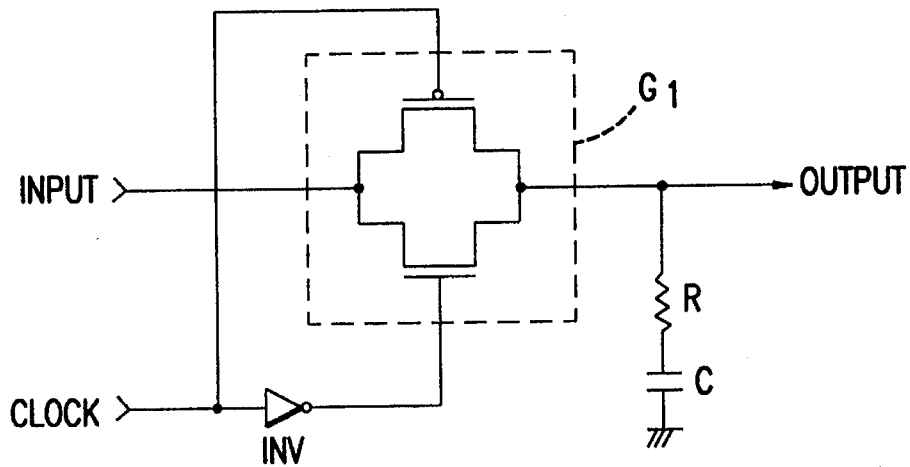
FIG. 10 is a circuit diagram of the sample-and-hold circuit of the chaotic neuron circuit according to the present invention.

FIG. 10 is a circuit diagram of the sample-and-hold circuit of the chaotic neuron circuit according to the present invention. In FIG. 10, the sample-and-hold circuit comprises an inverter INV for receiving and inverting a clock signal (CK1 to CK5), a CMOS transmission gate G1 for transmitting the input signal in response to the clock signal, and a resistor R and capacitor C connected in series between the output of CMOS transmission gate G1 and ground. Thus, when the clock signal is low, the sample-and-hold circuit having the above construction outputs (samples) an input signal and blocks (holds) the input signal when the clock signal is high.

Therefore, the construction of the non-linear circuit of the chaotic neuron circuit according to the present invention is simpler than that of the conventional art. As a result, the present invention provides a non-linear chaotic neuron circuit having a simple construction using the simplified non-linear circuit.

What is claimed is:

1. A non-linear circuit for use in a chaotic neuron circuit comprising:

a first variable resistor having a first end and a second end, the first end for receiving an input signal;

an amplifier having an inverting input, a non-inverting input and an output, the inverting input being connected to the second end of said first variable resistor and the non-inverting input being connected to ground;

a second variable resistor having a first end and a second end, the first end being connected to the inverting input of said amplifier;

a third variable resistor having a first end and a second end, the first end being connected to the output of said amplifier and the second end being connected to the second end of said second variable resistor; and a fourth variable resistor having a first end and a second end, the first end for receiving the input signal and the second end being connected to the second end of said third variable resistor.

2. A chaotic neuron circuit comprising:

a first sample-and-hold circuit, having an input and an output, for sampling a signal received at said input in response to a first clock signal, and holding the sampled value at said output;

non-linear means, coupled to the output of said first sample-and-hold circuits, for generating an output signal having a non-linear characteristic with respect to the output of said first sample-and-hold circuit;

an adder, coupled to said non-linear means, for receiving and summing the output signal of the non-linear means and an external input signal and for producing an output;

a second sample-and-hold circuit for sampling the output of said adder in response to a second clock signal and outputting the result as said signal to the input of said first sample-and-hold circuit; and a clock generator for generating said first and second clock signals, wherein said non-linear means comprises a first variable resistor having a first end and a second end., the first end coupled to receive the output signal of said first sample-and-hold circuit;

an amplifier having an inverting input, a non-inverting input and an output, the inverting input being connected to the second end of said first variable resistor and the non-inverting input being connected to ground;

a second variable resistor having a first end and a second end, the first end being connected to the inverting input of said amplifier;

a third variable resistor having a first end and a second end, the first end being connected to the output of said amplifier and the second end being connected to the second end of said second variable resistor; and a fourth variable resistor having a first end and a second end, the first end for receiving the output signal of said first sample-and-hold circuit and the second end being connected to the second end of said third variable resistor and the input of said adder.

3. A chaotic neuron circuit as claimed in claim 2, wherein said first sample-and-hold circuit comprises:

a first inverter for receiving and inverting the first clock signal;

a CMOS transmission gate for transmitting the output of said second sample-and-hold circuit in response to the first clock signal and the output of said first inverter; and a resistor and capacitor connected in series between the output of said CMOS transmission gate and ground.

4. A chaotic neuron circuit as claimed in claim 2, wherein said second sample-and-hold circuit comprises:

a second inverter for receiving and inverting the second clock signal;

a CMOS transmission gate for transmitting the output of said adder in response to the second clock signal and the output of said second inverter; and a resistor and capacitor connected in series between the output of said CMOS transmission gate and ground.

5. A chaotic neuron circuit as claimed in claim 2, wherein said first and second clock signals do not overlap each other.

6. A chaotic neuron circuit comprising:

a first sample-and-hold circuit, having an input and an output, for sampling a signal at its input in response to a first clock signal;

non-linear means, coupled to the output of said first sample-and-hold circuit, for generating an output signal having a non-linear characteristic with respect to the output of said first sample-and-hold circuit;

an adder for summing the output signal of said non-linear means and an external input signal;

a second sample-and-hold circuit for sampling the output of said adder in response to a second clock signal and outputting the result to as said signal to the input of said first sample-and-hold circuit;

a clock generator for generating said first and second clock signals, and third, fourth and fifth clock signals; and third, fourth and fifth sample-and-hold circuits for receiving said third, fourth and fifth clock signals, and outputting three output signals, respectively.

7. A chaotic neuron circuit as claimed in claim 6, wherein said non-linear means comprises:

a first variable resistor having a first end and a second end, the first end being coupled with the output of said first sample-and-hold circuit;

an amplifier having an inverting input connected to the second end of said first variable resistor and having a non-inverting input connected to ground;

a second variable resistor having a first end and a second end, the first end connected to the inverting input of said amplifier;

a third variable resistor having a first end and a second end, the first end connected to the output of said amplifier and the second end being connected to the second end of said second variable resistor; and a fourth variable resistor having a first end and a second end, the first end coupled to the output of said first sample-and-hold circuit and the second end being connected to the input of said adder and the second end of said third variable resistor.

8. A chaotic neuron circuit as claimed in claim 6, wherein the output of said adder is connected to the input of a multi-value logic circuit composed of a T-inverter.

9. A chaotic neuron circuit as claimed in claim 8, wherein said T-inverter comprises:

a PMOS transistor whose gate receives the output of said adder and whose source is commonly connected to a first power voltage;

a first resistor having a first end and a second end, the first end being connected to the drain of said PMOS transistor and to a first output terminal;

a second resistor having a first end and a second end, the first end being connected to the second end of said first resistor and to a second output terminal; and an NMOS transistor whose drain is connected to the second end of said second resistor and a third output terminal, whose source is connected to a second power voltage and whose gate receives the output of said adder.

10. A chaotic neuron circuit as claimed in claim 6, wherein said first sample-and-hold circuit comprises:

a first inverter for receiving and inverting the first clock signal;

a CMOS transmission gate for transmitting the output of said second sample-and-hold in response to the first clock signal and the output of said first inverter; and a resistor and capacitor connected in series between the output of said CMOS transmission gate and ground.

11. A chaotic neuron circuit as claimed in claim 6, wherein said second sample-and-hold circuit comprises:

a second inverter for receiving and inverting the second clock signal;

a CMOS transmission gate for transmitting the output of said adder in response to the second clock signal and the output of said second inverter; and a resistor and capacitor connected in series between the output of said CMOS transmission gate and ground.

12. A chaotic neuron circuit as claimed in claim 6, wherein said third sample-and-hold circuit comprises:

a third inverter for receiving and inverting the third clock signal;

a CMOS transmission gate for transmitting the output of said adder in response to the third clock signal and the output of said third inverter; and a resistor and capacitor connected in series between the output of said CMOS transmission gate and ground.

13. A chaotic neuron circuit as claimed in claim 6, wherein said fourth sample-and-hold circuit comprises:

a fourth inverter for receiving and inverting the fourth clock signal;

a CMOS transmission gate for transmitting the output of said adder in response to the fourth clock signal and the output of said fourth inverter; and a resistor and capacitor connected in series between the output of said CMOS transmission gate and ground.

14. A chaotic neuron circuit as claimed in claim 6, wherein said fifth sample-and-hold circuit comprises:

a fifth inverter for receiving and inverting the fifth clock signal;

a CMOS transmission gate for transmitting the output of said adder in response to the fifth clock signal and the output of said fifth inverter; and a resistor and capacitor connected in series between the output of said CMOS transmission gate and ground.

* * * * *